US006163767A

United States Patent [19]

[11] Patent Number: 6,163,767

[45] Date of Patent: Dec. 19, 2000

Tang et al.

[54] SPEECH RECOGNITION METHOD AND SYSTEM FOR RECOGNIZING SINGLE OR UN-CORRELATED CHINESE CHARACTERS

[75] Inventors: Donald T. Tang; Li Qin Shen; Xiao Jin Zhu, all of Beijing, China

[73] Assignee: International Business Machines Corporation, Armonk, N.Y.

[21] Appl. No.: 09/141,901

[22] Filed: Aug. 28, 1998

[30] Foreign Application Priority Data

Sep. 19, 1997 [CN] China .................................. 97119643

[51] Int. Cl.[7] ............................ G10L 15/00; G10L 15/06

[52] U.S. Cl. ......................... 704/231; 704/256; 704/257; 707/535; 707/536

[58] Field of Search .................................... 704/235, 260, 704/256, 257, 251, 231; 707/535, 536

[56] References Cited

U.S. PATENT DOCUMENTS

| | | | |
|---|---|---|---|
| 5,164,900 | 11/1992 | Bernath | 707/535 |
| 5,220,639 | 6/1993 | Lee | 704/200 |
| 5,319,552 | 6/1994 | Zhong | 707/535 |
| 5,602,960 | 2/1997 | Hon et al. | 704/207 |
| 5,680,510 | 10/1997 | Hon et al. | 704/255 |
| 5,764,851 | 6/1998 | Pengwu | 704/242 |
| 5,787,230 | 7/1998 | Lee | 704/235 |

*Primary Examiner*—David R. Hudspeth
*Assistant Examiner*—Daniel Abebe
*Attorney, Agent, or Firm*—Robert P. Tassinari

[57] ABSTRACT

A Chinese speech recognition (SR) method and system for single or un-correlated Chinese character(s). The method uses various types of Character Description Language (CDL) to describe the single or un-correlated Chinese character(s) to be inputted. The SR system uses CDL grammar directed speech recognizer to accept CDLs, which are inputted by voice. On the basis of analysis of CDL parser, the character generator gives a corresponding character. Therefore, recognition of single or un-correlated Chinese character(s) out of context can be made reliably.

5 Claims, 5 Drawing Sheets

SPEECH RECOGNITION METHOD AND SYSTEM FOR RECOGNIZING SINGLE OR UN-CORRELATED CHINESE CHARACTERS

FIELD OF THE INVENTION

This invention involves the techniques of Chinese speech recognition. More specifically, it involves a technique for recognizing single or un-correlated Chinese characters in a voice recognition system.

BACKGROUND OF THE INVENTION

With the advance of modern science and computer technology, the information exchange between human beings and computers is becoming more important. Traditional way of such communication is via a keyboard for input, and via a display or printer for output. When inputting Chinese characters, one needs to remember the coding scheme, which is very inconvenient. If a computer can have the ability of communicating through speech like human beings, then a dialog based on voice would be possible. This will change the man-machine communication fundamentally, and the overall efficiency of information processing will be greatly increased, Presently, with the great efforts of computer scientists, different types of speech recognition systems, and in particular, Chinese speech recognition systems, have been developed.

Since a Chinese character generally has several homonyms and near homonyms, existing Chinese speech recognition system rely on word, phrase, and higher language level information to resolve the ambiguities in Chinese characters. One generally uses an acoustic model to determine what is the most likely character according to the inputted syllable, and also uses the dictionary with probabilities and the language model where stores the higher level pattern of language usage to resolve the ambiguity of Chinese characters.

However, the recognition of single or un-correlated Chinese character out of context is very difficult, and typically it may be recognized as any one of a set of characters with same or similar pronunciations. As a result, speech input becomes very unreliable when the input is devoid of high level language information, e.g. people's names or city names. In addition, when there are mis-recognized characters in the output of a state-of-the-art speech recognition system, it is desirable to correct them via voice input.

In summary, an intelligent input method for recognizing single or un-correlated Chinese characters in a Chinese speech recognition system is needed.

BRIEF DESCRIPTION OF THE INVENTION

The method for recognizing single or un-correlated Chinese characters in a Chinese speech recognition system, described as the first aspect of this invention, includes the following steps:

- Describe the single or un-correlated Chinese characters with different types of character Description Language (CDL).
- Parse the input Character Description Language sentence.
- Generate the corresponding single or un-correlated Chinese characters according to the parsing.

A speech recognition system capable of recognizing single or un-correlated Chinese characters, described as the second aspect of this invention, includes the following components:

- CDL-based speech recognition system which recognizes different types of sentences in Character Description Language via speech input.
- CDL parser which parses these sentences.
- Character Generator which generates single or un-correlated Chinese characters according to the parsing done by CDL parser.

This invention solves the problem of unreliable recognition in a Chinese speech recognition system when single or un-correlated Chinese characters are inputted via speech.

BRIEF DESCRIPTION OF THE DRAWINGS

The advantage of this invention can be seen more evidently by means of the following descriptions with appending figures.

DETAILED DESCRIPTION OF THE INVENTION

Figure 1:
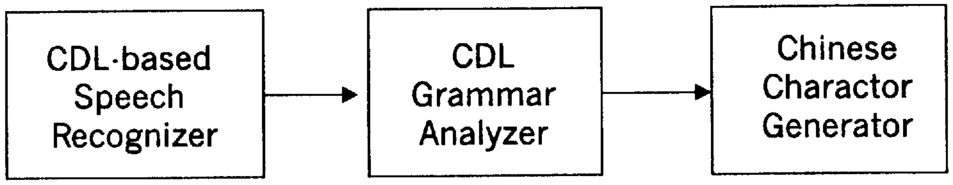
FIG. 1 is a block diagram showing the Chinese speech recognition system as described in this invention.

A particular Character Description Language, according to the implementation of this invention, can have the following forms:

A: Describe a character by an ad hoc word which people usually use. We write Type A=(w), where "w" denotes the word. The word actually refers to a Chinese character or a radical, e.g. "mu4 zi3 li3 木子李" meaning "李", "kou3 tian1 wu2(口天吴)" meaning "wu2(吴), or "coa3 zi4 tou2(草字头)" meaning a radical "艹". Most of the radicals and some of the Chinese characters, especially family names, can be described by Type A.

B: Describe a character with the help of a related word. We write Type B=(w "de(的)" c). This type of description starts with a word, followed by the character "de(的)" and then another single character which is one of the characters in the word. When a user tries to input a single character, Type B allows him to use a word which contains the desired character to identify it. Such a word is ideally an acoustically easily recognizable dictionary entry, such as a commonly used word, an idiom, or a well known proper name. Examples: "tai2 wan1 de tai2 (台湾的台)" to identify "tai2(台)", "tai2 dou2 de tai2(抬头的抬)" to identify "tai2(抬)"; "bao3 bei4 de bei4 (宝贝的贝)" to identify "bei4(贝)", "zhun3 bei4 de bei4(准备的备)" to identify "bei4(备)"; "mo4 ming2 qi2 miao4 de mo4 (莫名其妙的莫)" to identify "mo4(莫)", "deng4 ziao3 ping2 de deng4 (邓小平的 邓)" to identify "deng4(邓小平的)", etc. In general, "c" in Type B may also be used to describe multiple characters. This may be particularly useful when two or more characters are taken from an idiom or another name to form a name. Also, "w" in Type B may also be generalized to a phrase or word sequence. For example, we may use "deng4 ziao3 ping2 de ziao3 ping2 (邓小平的小平)" to capture "ziao3 ping2(小平)" , and "da4 cai2 xiao3 yong4 de da4 cia2 (大材 小用的 大材)" to capture "da4 cai2(大材)".

C: Take advantage of Chinese character's structure information. Chinese is ideographic and most of the characters can be decomposed into simpler characters or radicals. Therefore we can either subtract undesired parts from a complicated character or add simple characters and radicals together to get a desired character. This type can be used when it is not easy to find a word containing the desired character, or when the pronunciation of the character is not known to the user. According to the different approaches used, Type C is further divided into three subtypes:

C1: Specify a character by its position in a more complex character. We write Type C1=(cd "de(的)" pos), where "cd" is a description of a character c(or a radical, we do not distinguish them in the following paragraphs), and "pos" is a position word. We use "cd" instead of c itself because c is assumed to be unreliable in recognition. The position word "pos" can be "zuo3 bian1(左边)", "you4 bian1(右边)", "shang4 mian4(上面)", "li3 mian4(里面)", "zhong1 jian1(中间)", etc. Example of Type C1: "xing2 zheng4 yuan4 de xing2 de you4 bian1(行政院的行的右边)" may be used to describe "chu4(亍)".

C2: Remove a component from a character to form a new one. We write Type C2=(cd1 pos "qu4 diao4(去掉)" cd2). Example: "ye3 de ye3 zhong1 jian1 qu4 yi2 shu4(也许的也 中间 去掉一竖)" is the most natural description people will use for "mie1(乜)". The position word is optional.

C3: Add up several components(characters or radicals) to form a more complicated character. A basic Type C3 description has the form (pos1 "shi4(是)" cd1, pos2 "shi4(是)" cd2, . . . ), which specifies each component character together with its position in the final character. One can use "zuo3 bian1 shi4 ti2 shou3 pang2, you4 bian1 shi4 wu2 chan3 jie1ji2 de wu2 (左边 是 上面, 右边 是 无产阶级的无)" to form "fu3(抚)". Note here in the first clause, cd1 is of Type A, while in the second clause, cd2 is of Type B. A lot of variations of Type C3 is allowed, for example: "shang4 mian4 he2 shan1 po1 de shan1 yi2 yang4, xia4 mian4 shi4 yi2 ge4 gu4 ti3 de gu4 (上面 和 山坡的山 一样, 下面有 一个 固体的固)" meaning "gu4 (▽)"; "san1 dian3 shui3 jia1 shang4 ge4 li4 zao3 zhang1 三点水 加上个立早章)" meaning "zhang1(漳)". As these example show, the syntax of Type C3 is designed in such a way that it can cover most patterns a user may use in natural language. This will greatly enhance user friendliness.

D: Specify a character by means of its semantics. We write Type D=(c "yi4 si1 shi4(意思是)" w). For instance, "jin3 yi4 si1 shi4 yu4 shi2(瑾意思是 玉石)" gives "jin3(瑾)", "jin3 yi4 si1 shi4 ji1 huang1(馑意思是 饥荒)" gives "jin3(馑)".

E: Use strokes to describe a character. All Chinese characters can be ultimately decomposed into strokes. There are roughly 6 different types of strokes, i.e. "heng2(横)", "shu4(竖)", "pie 3(撇)", "na4(捺)", "zhe2(折)", "dian3(点)". Type E=(c "bi3 hua4 shi4(笔画是)" n1 s1 n2 s2 n3 s3 . . . ), where c is optional and n1, n2, n3 are numbers an s1, s2, s3 are strokes. Example: "ma bi3 hua4 shi4 yi4 pie3 yi4 zhe2 yi4 dian3 (么笔画是 一撇一折 一 点)" meaning "ma(么)". it is not always necessary to give all the strokes a character possesses, a few beginning strokes may be adequate. Moreover, strokes may be added together like in "wang2 bi3 hua4 shi4 san1 heng2 yi2 shu4 (玉笔画是 三横 一竖)", where the character "wang2(王)"'s three horizontal strokes are expressed as "san1 heng2(三横)". Furthermore, it is also allowed to simply specify the total number of strokes like in "ta1 bi3 hua4 shi4 wu3 hua4 (它笔画是一撇一划)", which means "ta1(它)".

F: Describe single English letters with Chinese. While a lot of Chinese people may not be familiar with the pronunciation of English letters, most of them are familiar with Pinyin, a system that gives phonetic symbols for every Chinese character using English letters. We write Type F=(w "de tou2 yi1 ge4 pin1 yin1 zi4 mu3(的头一个 拼音字母)"), or more concisely, Type F=(w "de tou2 pin1 (的头拼)"). The meaning of a Type F description is the first letter in word w's Pinyin. Example: "a1 yi2 de tou2 pin1(阿姨 的头拼)" meaning "A", "zhong1 guo2 de tou2 pin1(中国的头拼)" meaning, "Z". Three special rules are defined to handle "I", "U", "V" because in Pinyin these letters either never occur as the first letter, or never occur at all. We use "yi(一,移,以,易, etc.)" for "I", "yu:(於,鱼,雨 玉, etc.)" for "V", other Pinyin that starts with "y" for "Y", e.g. "yan1(烟)", "yun4(韵)", etc. Similarly, we use "wu(屋,无,五,物, etc.)" for "U", other Pinyin that stars with "w" for "W", e.g. "wa1(蛙)", "weng1(翁)", etc. As a generalization, the last letter of a Pinyin can also be specified like (w "de wei3 pin1(的尾拼)").

These types can be used simultaneously to form complex, yet powerful description. Example: "shang4 mian4 yi2 ge4 cao3 zi4 tou2, xiz4 mian4 zuo3 bian1 shi4 bai2 se4 de bai2, xia4 mian4 you4 bian1 shi4 ba1 li2 de ba1 (上面 一个 草字头, 下面左边是白色的白, 下面右边是 巴黎的巴)" is recognized as "pa1(葩)".

It can be seen from the description above that the Character Description Language can be used to specify a certain Chinese character easily and accurately. According to this invention, a speech recognition system capable of recognize single or un-correlated characters is shown in FIG. 1.

FIG. 1 shows the system consisting of three components: CDL based speech recognition component, CDL parser and Chinese character generator.

Figure 2:
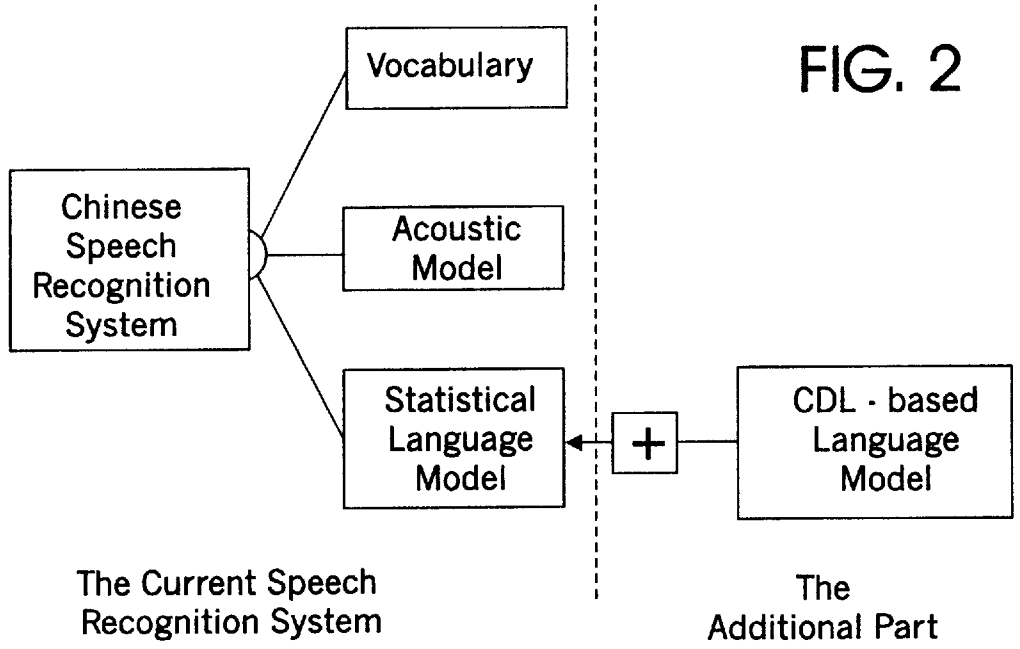
FIG. 2 is a block diagram showing the CDL-based speech recognition component depicted in FIG. 1.

In order to improve recognition accuracy, this invention's single or un-correlated Chinese character speech recognition system employs a CDL based speech recognizer to capture the descriptive sentences people input via voice. As shown in FIG. 2, a CDL base speech recognizer differs from an ordinary Chinese speech recognition system in its language model. An ordinary Chinese speech recognition system consists of a vocabulary, an acoustic model and a language model, as shown in the left part of FIG. 2. The acoustic model determines the possible Chinese characters corresponding to a certain inputted voice, while the statistical language model eliminates the ambiguity among characters. In order to improve recognition accuracy, that is, in order to make the system recognize different types of CDL sentences better, a CDL grammar based language model is used in addition to the ordinary speech recognition system's language model. In this way, when people describe a Chinese character with CDL language, the CDL based speech recognizer includes the so-called CDL grammar based language model, so it can recognize voice inputted CDL sentences more accurately. Suppose that a grammar based language model is built specifically for the descriptive sentences in the first implementation example, and a user inputs via voice "tai2 wan1 de tai2(台湾的台)", since a grammar rule, Type B=(W "de(的)" C), is already stored in the CDL grammar based language model, it is quite easy for the recognition component to recognize this sentence in the form (W "de(的)" C) once it matches "tai2 wan1" to a word in the statistical language model.

Figure 3:
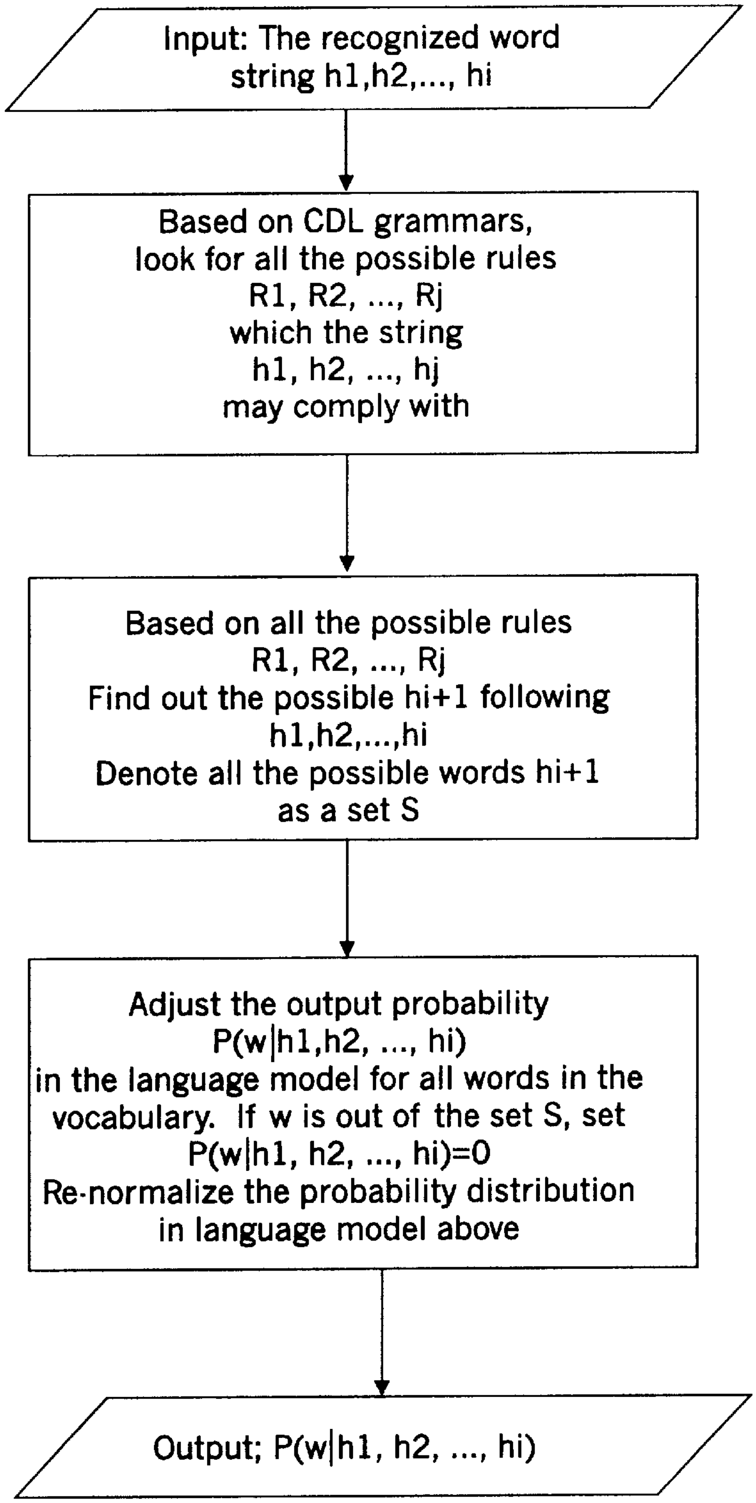
FIG. 3 is a flow chart showing the use of CDL-base language model.
Figure 4:
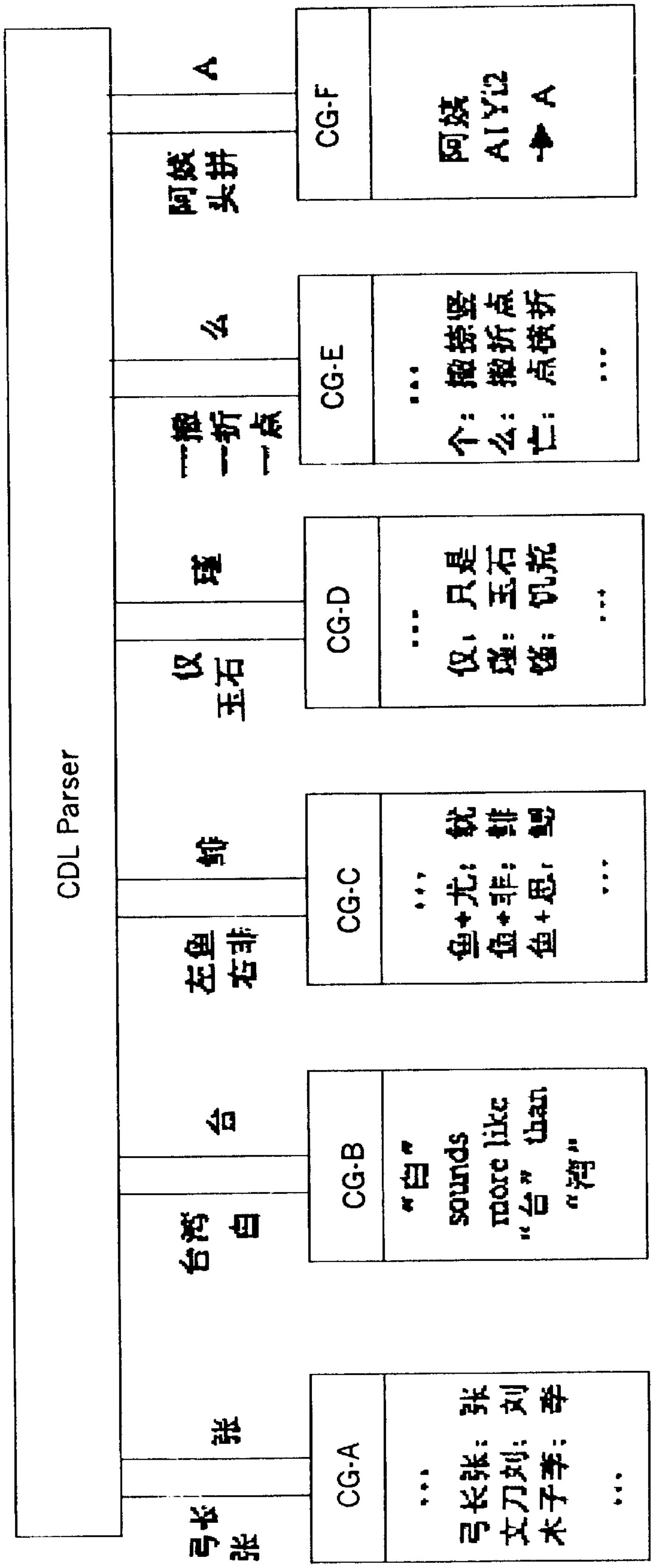
FIG. 4 is a block diagram showing the CDL parser and Character generators depicted in FIG. 1.

FIG. 3 is a flow chart showing the use of CDL-based language model. First a word string consisting of previously recognized words h1, h2, . . . , hi is inputted. The grammar rules R1, R2, . . . , Rj that h1,h2, . . . , hi may follow in CDL grammar are then found. For each one of the grammar rules R1,R2, . . . ,Rj, the next possible word hi+1 of string h1,h2, . . . ,hi is found. All the possible hi+1's form set S. Then the probability estimation of each word w in the vocabularly is modified by the language model: P(w|h1,h2, . . . ,hi) is set to zero if w is not in S. Next, the probability estimations are normalized to give the final output P(w|h1,h2, . . . , hi), i.e. the conditional probability of w in context h1,h2, . . . ,hi.

The recognition result of the speech recognizer based on CDL grammar rules, which is a sentence satisfying CDL grammars, is fed to the second part of the speech recognition system for recognizing single or un-correlated chinese characters, i.e. CDL grammar analyzer, for grammar analysis. In the implementation of this invention, the rules which the grammar analyzer is based on are:

CD: Character Description

PD: Partial Character Description

POS: position word

W: a word

C: a character n: a number

CD:=
TypeA|TypeB|TypeC1|TypeC2|TypeC3|TypeD|TypeE|TypeF

TypeA:=W

TypeB:=W "de(的)" C

POS:="zuo3 bian1(左边)"|"you4 bian1(右边)"|"xia4 mian4 zuo3 bian1 (下面左边是)"| . . .

TypeC1:=CD "de(的)" POS

TypeC2:=CD "qu4 diao4(去掉)"[["yi1(一)"] "ge4(个)"] CD

PD:=[[POS["shi4(是)"|"you3(有)"]] ["jia1 shang4(加上)"] [["yi1(一)"] "ge4(个)"]]CD|POS "he2(和)" CD "yi2 yang4(一样)"

TypeC3:=PD|PD TypeC3

TypeD:=C "yi4 si1 shi4(意思是)" W

STROKE:=[n] "heng2(横)"|"shu4(竖)"|"pie3(撇)"|"na4(捺)"|"zhe2(折)"|"dian3(点)"|"hua4(划)"

STROKES:=STROKE|STROKE STROKES

TypeE:=[C] "bi3 hau4 shi4(笔画是)" STROKES

TypeF:=W "de(的)" "tou2 yi1 ge4 pin1 yin1 zi4 mu3(头一个拼音字母)"|"tou2 pin1(头拼) "|"wei3 pin1 (尾拼)"

Based on above rules, CDL grammar analyzer analyzes grammatically the output of the CDL based speech recognizer. When it satifies a particular type of grammar definition, the correspondent part of the character generator is invoked and the correspondent Chinese character is generated. This procedure iterates till the grammar analysis for the whole description sentence is finished.

The character generator is composed of the parts corresponding to CDL description languaguage. When a certain grammar rule is applied to a description sentence by the CDL grammar analyzer, the character generation is invoked, and the correspondent part of the character generator generates a Chinese character based on the prior knowledge.

The components of the character generator are:

CG-A: the input is (W). Get a character simply by looking up the table which maps the characters from their correspondent words.

CG-B: the input is (W,C), where W is a word, and C is a Chinese character. Here C may be recognized incorrectly as C- which is a homonym or near-homonym of C. CG-B will find the correct C in the word W which sounds like C-acoustically.

CG-C: the input are all the components of a character (Chinese character or radical), their positions and actions (add or remove etc.) We build a dictionary with all the position descriptions of the characters, and it is stored according to the radicals or the number of the strokes of the characters. With this dictionary, one can compose or decompose a Chinese character. Different types of searching technique can be applied here to improve the efficiency of searching.

CG-D: the input is (C, W), where W is a word describing the meaning of C. Same as that described in CG-B, C may be recognized incorrectly as C-(homonym or near-homonym of C). Here one needs a dictionary containing the meanings of Chinese characters. Because W may not match exactly with the meaning in the dictionary, the meaning distance should be defined and calculated here.

CG-E: the input is C(optional) and its partial or total strokes information. Here one needs a dictionary containing the stroke information of each Chinese character. If we have C as the input, we can minimize the searching space with its acoustic information.

CG-F: the input is W. The output is the first(or the last) character of the Pinyin of W.

FIG. 3 illustrates how CDL grammar analyzer and the each component of the character generator works together harmoniously. Below is a simple example to describe how CDL grammar analyzer and the character generator works.

Suppose that the output of CDL-based speech recognizer is:

上面，一个草字头(Above is a Cao3Zi4Tou2), 下面左边是白色的白(below on the left is Bai2Se4 De Bai2), 下面右边是巴黎的巴(below on the right is Ba1Li2 De Ba1).

白-(Bai2-): denotes the homonym of Bai2.

巴-(Ba1-): denotes the homonym of Ba1.

Below is the procedure the CDL grammar analyzer takes:

```
POS  Type A        POS  Type A        POS  Type A
        CD                 CD                 CD
--------------     --------------     --------------
    PD                 PD                 PD
------------------------------------------------------
                     TypeC3
                    --------
                       CD
```

The corresponding parts of the character generator invoked are:

CG-A: 艹

CG-B: 白

CG-B: 巴

CG-C: 葩

Figure 5:
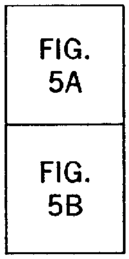
FIG. 5 is a flow chart showing how to generate single or un-correlated Chinese characters by parsing an inputted CDL sentence.
Figure 5A:
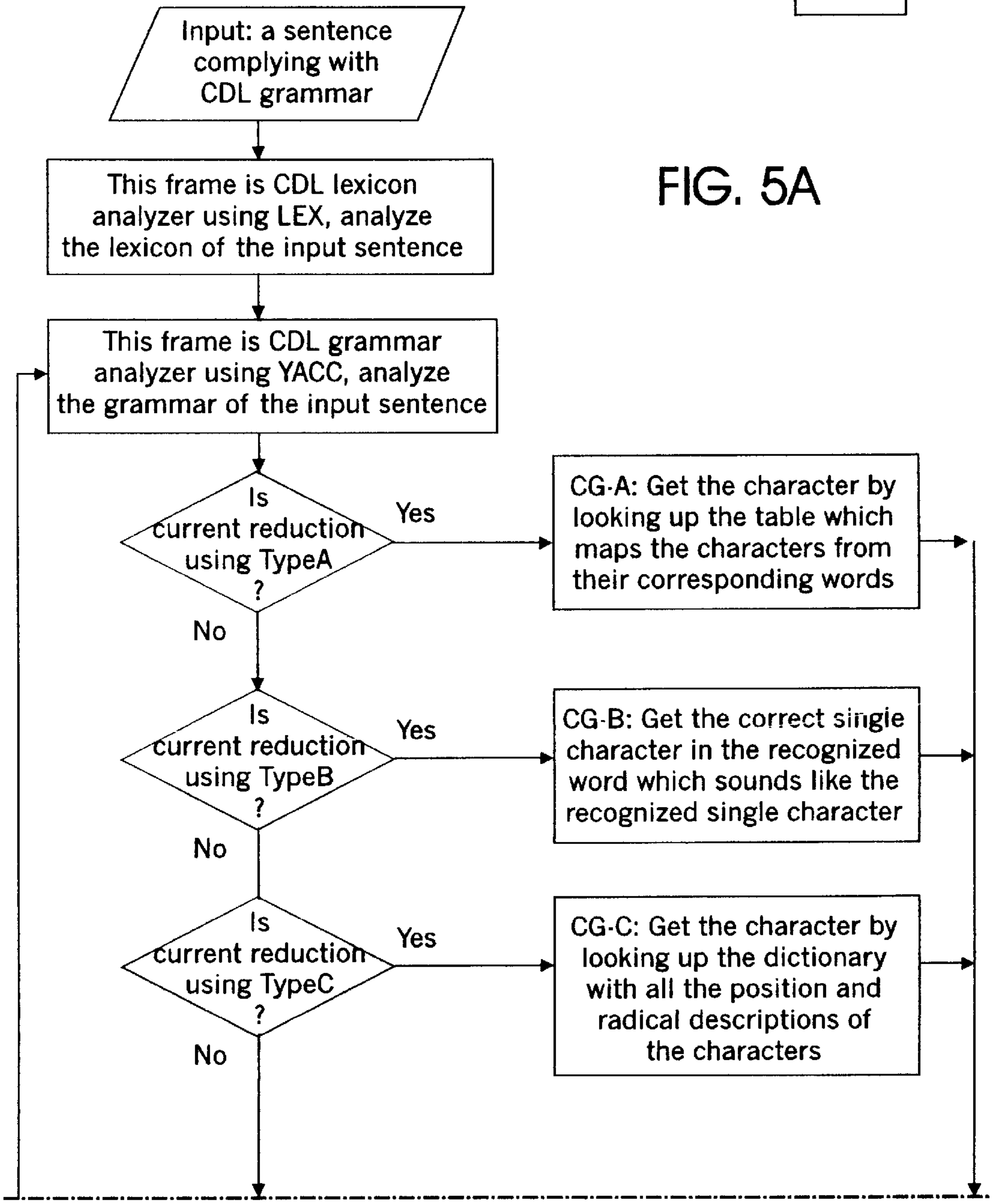
Figure 5B:
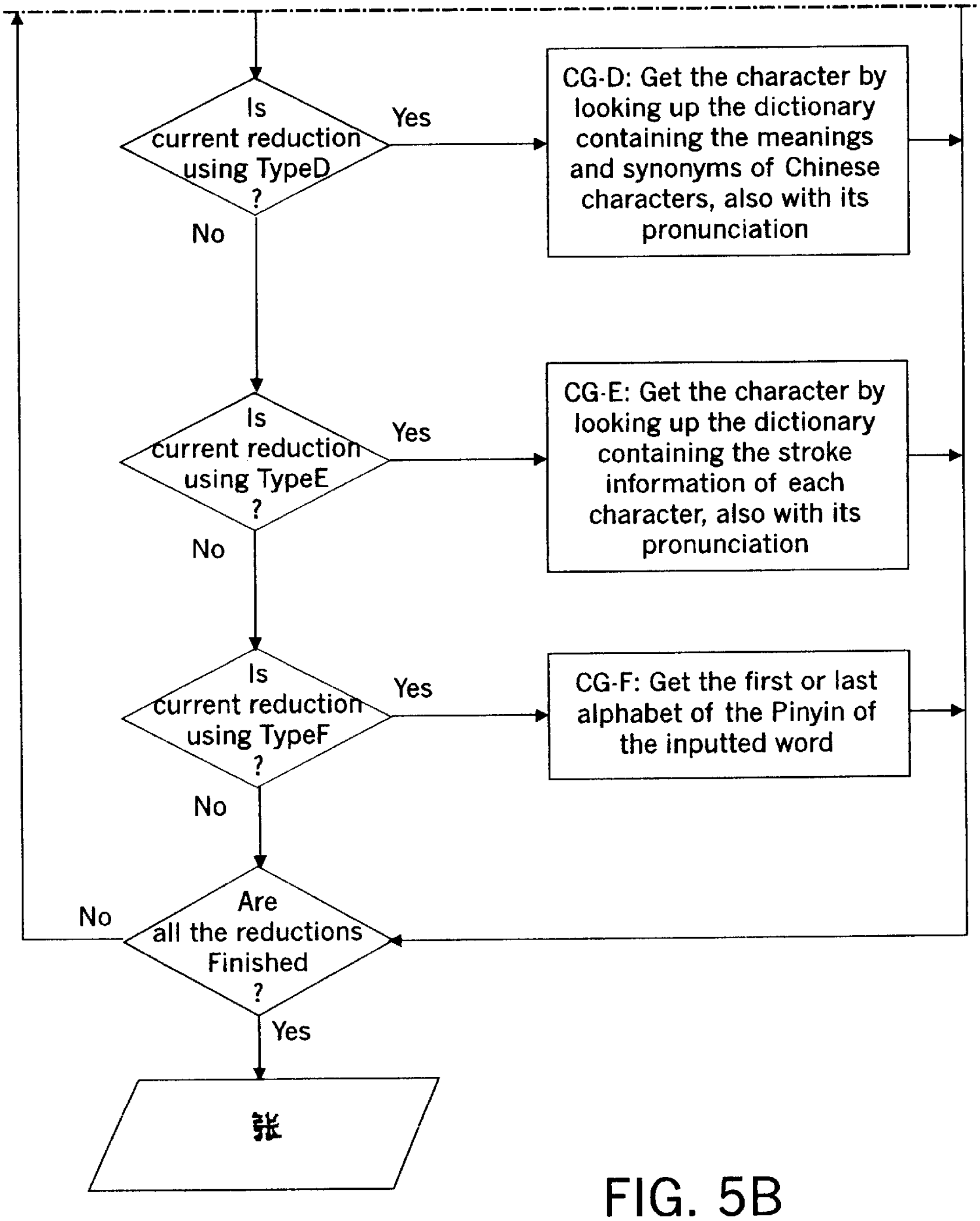

FIG. 5 is the flow chart showing how to analyze the grammar of the Chinese character description language and generate the single or un-correlated chinese characters.

Illustrated as FIG. 5, if the current reduction is using the rule Type A, we look up the table of the specific word and its corresponding character to get the single character. If the current reduction is using the rule TypeB, get the single character which is acoustically close to the character in the word. If the current reduction is using the rule TypeC, we look up the dictionary containing the characters and their components and radicals to get the character. If the current reduction is using the rule TypeD, we look up the dictionary containing the characters and their meanings and synonyms and identify the single character by its pronunciation. If the current reduction is using the role TypeE, we look up the dictionary containing the characters and their stoke information and identify the single character by its pronunciation. If the current reduction is using the rule TypeF, get the first or last alphabet of the Pinyin of this word. The iteration goes on untill the reduction ends.

In the implementation described above, a special CDL-based speech recognizer is not necessary, one may use a general speech recognizer.

With the above description, it can be seen that a single or un-correlated Chinese character can be recognized reliably using this invention. All the implementation examples are used to illustrate this invention and thus should not be viewed as restrictions to this invention. The protection items covered in this invention is defined in the claim section.

What is claimed is:

1. A recognition method for single or un-correlated Chinese character(s) in a Chinese speech recognition system, characterized by the steps of:

describing the single or un-correlated Chinese character (s) to be inputted by means of various types of character Description Language wherein the various types of Character Description Language comprise:

A) describing a character by an ad hoc word which people usually use;

B) describing a character with the help of a related word;

C) describing a character taking advantage of Chinese character's structure information;

D) describing a character by means of semantics;

E) describing a character through stroker; and

F) describing single English letter switch Chinese Pinyin, so that a single or un-correlated Chinese character(s) can be described by one of said various types of character Description Language or by combination of them;

parsing the inputting various types of Character Description Language; and generating a corresponding character on the basis of parsing analysis.

2. The method of claim 1 including the steps of analyzing the grammar of the Chinese Character Description Language and generating the single or un-correlated Chinese characters as follows;

looking up in a table the specific word and its corresponding character to get the single character if the current reduction uses type A;

getting the single character which is acoustically close to the character in the word if the current reduction uses type B;

looking up in a dictionary containing the characters and their components and radicals to get the character if the current reduction uses type C;

looking up in a dictionary containing the characters and their meanings and synonyms and identify the single character by its pronunciation if the current reduction uses type D;

looking up in a dictionary containing the characters and their stoke information and identify the single character by its pronunciation if the current reduction uses type E; and getting the first or last alphabet of the Pinyin of this word if the current reduction uses type F.

3. The method of claim 1 including the steps of:

inputting a word string consisting of previously recognized words h1, h2, . . . , hi;

finding the grammar rules R1, R2, . . . , Rj that h1, h2, . . . , hi in CDL grammar;

finding for each one of the grammar rules R1, R2, . . . , Rj, the next possible word hi+1 of string h1, h2, . . . , hi;

forming a set of all the possible hi+1's;

modifying the probability estimation of each word w in the vocabulary by the language model;

setting P(w|h1, h2, . . . , h1) to zero if w is not in S; and normalizing the probability estimations to give a final output P (W|h1, h2, . . . , hi).

4. A Chinese speech recognition system for single or un-correlated Chinese character(s), characterized by comprising:

CDL grammar directed speech recognizer for accepting various types of Character Description Language to be inputted by voice wherein the various types of Character Description Language comprise at least two of the following types;

A) describing a character by an ad hoc word which people usually use;

B) describing a character with the help of a related word;

C) describing a character taking advantage of Chinese character's structure information;

D) describing a character by means of semantics;

E) describing a character through strokes; and

F) describing a single English letter with Chinese Pinyin;

CDL parser for parsing the Character Description Language outputted by said CDL grammar directed speech recognizer;

character generator for generating a corresponding character on the basis of analysis of parser.

5. The speech recognition system of claim 4 wherein said various types of character descriptions comprise all of the types A to F.

* * * * *